UNITED STATES PATENT OFFICE.

MARIE ANNA HEGINGER, OF NEW YORK, N. Y.

FOOD PRODUCT.

1,376,334. Specification of Letters Patent. Patented Apr. 26, 1921.

No Drawing. Application filed June 20, 1918. Serial No. 240,925.

*To all whom it may concern:*

Be it known that I, MARIE A. HEGINGER, a subject of the Emperor of Austria, residing at New York, in the county and State of New York, have invented certain new and useful Improvements in Food Products, of which the following is a specification.

My invention relates to food products, and particularly to breads of the type wherein potatoes form an important element.

The use of potatoes as a constituent of bread is well known, but the production of a satisfactory bread of this nature has heretofore been considered impossible unless at least double the quantity of wheat flour was added to the quantity of potatoes used. At a time when the conservation of wheat is so important and potatoes are abundant and available as a substitute for wheat, it is obvious that, if a potato bread could be produced wherein the proportionate quantity of potatoes used was substantially greater in proportion to the quantity of flour than was heretofore known, and particularly if the flour employed could be made from rye, barley, corn, or other cereal instead of wheat, an important and valuable result would be achieved. It is the object of this invention to produce a bread having the characteristics just referred to.

In making the bread I select potatoes of a good grade having a natural tendency to mealiness and, after peeling, cook them gently to a point short of their becoming soft and assuming a broken down condition. I then remove the potatoes from the water in which they have been boiled and subject them to a process which I consider is of prime importance, since it makes possible the use of the potatoes in such a large proportionate volume. I accomplish this by steaming the boiled potatoes until steam or vapor no longer appears to be given off from the potatoes themselves and they become dry and mealy in appearance. The steaming operation is at this point discontinued and the potatoes are next subjected to the action of a mechanical mixer. I have found an ordinary food chopper to be admirably adapted for this purpose.

By repeated experiments I have found that the mechanical condition of the potatoes as they emerge from the disintegrator following the dry steaming operation, is much better adapted to combine with a comparatively small quantity of cereal flour to make a light and wholesome bread than is the case when the ordinary boiled and mashed potatoes are made use of.

In making up bread from potatoes treated as described, I preferably take substantially equal quantities of the potatoes so treated and mix them with an equal or substantially equal quantity by weight of wheat, corn, barley, rye or other flour. It is to be noted that flours other than those made from wheat can be successfully used. I add also a small quantity of milk, yeast, sugar and salt, and knead the ingredients into a stiff dough. The dough is then allowed to rise for several hours as, for instance, over night, when it is again kneaded and formed into loaves and baked.

I have found the following quantities well adapted to form a baking of convenient size:

Five pounds potatoes,
Five pounds flour,
Small cup milk,
One yeast cake,
Salt, sugar or other sweetening ingredient.

I have found that bread made by the described process is of a quality approaching that made from the finest wheat flour, and that there is a complete absence of the sogginess, heaviness, coarseness, and the objectionable dark color characteristic of breads heretofore made with a correspondingly large proportion of potatoes. I have also found that bread made according to the formula disclosed has remarkable keeping qualities that are far superior to those possessed by ordinary bread made wholly from wheat or other cereal flour. This feature is so pronounced that a loaf of such bread that has been baked as many as ten days has a scarcely perceptible diminution of its freshness.

Having thus described my invention, what I claim and desire to secure by Letters Patent of the United States is:

1. That process for preparing potatoes to form an ingredient of a baked food product, which consists in first boiling the potatoes until they have begun to soften, and then in steaming the potatoes until they assume a comparatively dry and mealy condition.

2. The process of preparing a food product which consists in boiling potatoes until they have begun to soften, then in steaming the potatoes until they assume a mealy condition, and then in mixing the product thus obtained with wheat flour.

3. The process of preparing a food product which consists in boiling potatoes in water until they have begun to soften, then in steaming the potatoes out of contact with water until they assume a mealy condition, then in mixing the product thus obtained with wheat flour, and in baking the resulting mixture.

Signed at New York, in the county and State of New York, this 17th day of June, 1918.

MARIE ANNA HEGINGER.